(12) United States Patent
Grasso, Jr. et al.

(10) Patent No.: US 10,369,575 B2
(45) Date of Patent: Aug. 6, 2019

(54) PROCESS FOR CLEANING DIRTY POST-CONSUMER WASTE GLASS

(71) Applicant: Urban Mining Northeast, LLC, New Rochelle, NY (US)

(72) Inventors: Louis P. Grasso, Jr., New Rochelle, NY (US); Dale Hauke, Riviera Beach, FL (US)

(73) Assignee: Urban Mining Northeast, LLC, New Rochelle, NY (US)

( * ) Notice: Subject to any disclaimer, the term of this patent is extended or adjusted under 35 U.S.C. 154(b) by 406 days.

(21) Appl. No.: 15/154,361

(22) Filed: May 13, 2016

(65) Prior Publication Data

US 2017/0050192 A1   Feb. 23, 2017

Related U.S. Application Data

(60) Provisional application No. 62/208,122, filed on Aug. 21, 2015.

(51) Int. Cl.
| | |
|---|---|
| B02C 21/00 | (2006.01) |
| B02C 23/08 | (2006.01) |
| B02C 23/14 | (2006.01) |
| B03B 9/06 | (2006.01) |
| B02C 19/00 | (2006.01) |

(Continued)

(52) U.S. Cl.
CPC ...... *B02C 19/0087* (2013.01); *B02C 19/0081* (2013.01); *B02C 23/14* (2013.01); *B02C 23/18* (2013.01); *B03B 9/062* (2013.01); *B03C 1/18* (2013.01); *B03C 1/24* (2013.01); *B03C 1/30* (2013.01); *B07B 15/00* (2013.01); *C03C 1/002* (2013.01); *C03C 12/00* (2013.01); *C03C 23/0075* (2013.01); *Y02W 30/526* (2015.05); *Y02W 30/60* (2015.05)

(58) Field of Classification Search
CPC . B02C 19/0087; B02C 19/0081; B02C 23/14; B02C 23/18; B02C 23/16; B02C 23/30; B02C 23/08; B30B 9/06; B30B 9/062; B20C 19/0087; B20C 19/0081; B09B 3/00
USPC ................................ 241/24.22, 24.3, 65, 99
See application file for complete search history.

(56) References Cited

U.S. PATENT DOCUMENTS

| | | | |
|---|---|---|---|
| 3,524,594 A | * | 8/1970 | Anderson ................. B03B 9/06 241/19 |
| 3,650,396 A | | 3/1972 | Gillespie et al. |

(Continued)

OTHER PUBLICATIONS

Bowling, Jarrett; Customized Drying Solution: Provides Efficiency; Nov. 2014; Process Heating; vol. 21, Issue 11, pp. 28-31 (Year: 2014).*

(Continued)

*Primary Examiner* — Shelley M Self
*Assistant Examiner* — Katie L. Parr
(74) *Attorney, Agent, or Firm* — Gordon & Jacobson, P.C.

(57) ABSTRACT

A method is provided to clean glass mixed with non-glass undifferentiated trash. In the method, the glass pieces are kept as large as possible to thereby minimize the amount of surface area that needs to be cleaned. The glass pieces are cleaned without washing the glass pieces with water or a surfactant during the cleaning process. The non-glass contaminants are liberated from the glass by drying and abrasion, and then removed from the glass by screening and density separation.

9 Claims, 2 Drawing Sheets

(51) Int. Cl.
*C03C 23/00* (2006.01)
*B02C 23/18* (2006.01)
*C03C 1/00* (2006.01)
*C03C 12/00* (2006.01)
*B07B 15/00* (2006.01)
*B03C 1/18* (2006.01)
*B03C 1/24* (2006.01)
*B03C 1/30* (2006.01)

(56) References Cited

U.S. PATENT DOCUMENTS

| | | | |
|---|---|---|---|
| 3,655,138 A | 4/1972 | Luscombe | |
| 3,703,970 A | 11/1972 | Benson | |
| 3,720,380 A * | 3/1973 | Marsh | B03B 9/06 |
| | | | 209/17 |
| 3,897,330 A | 7/1975 | Rhys | |
| 3,970,254 A | 7/1976 | Marsh | |
| 4,065,282 A | 12/1977 | Morey | |
| 4,069,979 A | 1/1978 | Morita et al. | |
| 4,867,384 A | 9/1989 | Waltert | |
| 5,350,121 A | 9/1994 | Vitunac et al. | |
| 5,524,837 A | 6/1996 | Raynes | |
| 5,772,126 A * | 6/1998 | Hanvey, Jr. | B03B 9/062 |
| | | | 241/152.2 |
| 6,199,778 B1 | 3/2001 | Hanvey, Jr. | |
| 6,464,082 B1 | 10/2002 | Kimmel et al. | |
| 8,127,933 B2 * | 3/2012 | Bohlig | B03B 9/061 |
| | | | 209/12.1 |
| RE45,290 E | 12/2014 | Andela | |
| 2006/0000237 A1 * | 1/2006 | Bohlig | B03B 9/062 |
| | | | 65/29.11 |
| 2006/0130707 A1 | 6/2006 | Grasso, Jr. et al. | |
| 2007/0012599 A1 | 1/2007 | Bohlig et al. | |
| 2009/0283018 A1 | 11/2009 | Grasso, Jr. et al. | |
| 2012/0018548 A1 | 1/2012 | Andela | |
| 2012/0037733 A1 * | 2/2012 | Gitschel | B03B 9/06 |
| | | | 241/24.1 |
| 2012/0048975 A1 * | 3/2012 | Gitschel | B02C 23/08 |
| | | | 241/24.13 |
| 2012/0211032 A1 * | 8/2012 | Trojosky | B03B 5/56 |
| | | | 134/32 |
| 2012/0217328 A1 * | 8/2012 | Bohlig | B03B 9/061 |
| | | | 241/24.13 |

OTHER PUBLICATIONS

Dias, Nilmara; Recovery of glass from the inert fraction refused by MBT plants in a pilot plant; Aug. 2015; Waste Management; vol. 46, pp. 201-211 (Year: 2015).*

* cited by examiner

PROCESS FOR CLEANING DIRTY POST-CONSUMER WASTE GLASS

CROSS-REFERENCE TO RELATED APPLICATIONS

This application claims benefit to U.S. Prov. Ser. No. 62/208,122, filed Aug. 21, 2015, which is hereby incorporated by reference herein in its entirety.

BACKGROUND OF THE INVENTION

1. Field of the Invention

The present invention relates to a process to clean dirty broken waste glass that is comingled with undifferentiated trash. The invention also relates to further processing of the clean glass into ground glass products.

2. State of the Art

Material recovery facilities (MRFs) receive recyclable materials. In a relatively automated process, a MRF separates recyclables collected primarily from residential curbsides into homogeneous product streams (e.g., cardboard, mixed paper, aluminum cans, etc.). In addition, such recyclable glass-containing materials can be received from other sources. Other sources include, but are not limited to, restaurant and bar bottle collection companies, construction and demolition MRFs, municipal solid waste (MSW) incinerator bottom ash, any type of glass product manufacturing process. For purposes herein, MRF shall be used to inclusively represent all of these sources.

There are two types of MRFs: single stream and dual stream. Initially, all residential MRFs were dual stream. In a dual stream MRF, paper products are collected separately from cans, bottles and plastics. A dual stream MRF has picking lines where unbroken clear and amber bottles are hand-picked and color separated, with the broken and green glass disposed. With the advancement of MRF processing technology allowing for more capital intensive automation that is cost justified by the reduction in labor effort, most dual stream MRFs converted to single stream.

For single stream MRF processing, all recyclables are comingled at the curbside. Glass is a problem in a single stream MRF because of the damage glass can cause to the processing equipment. Therefore, most single stream MRFs crush the comingled materials and screen the glass out early in the sorting and separation process, often after cardboard removal. Along with the glass comes bits and pieces of plastic, paper, ferrous and non-ferrous metals, ceramics, stones, dirt and organics such as pizza crust, etc.

Typical single stream MRF residue is 70%-85% glass, 1%-10% moisture and the remaining being undifferentiated trash. The broken glass size is typically 2 to 3 inches and smaller (2 or 3 inch minus). The plastic fraction may contain large pieces (e.g., whole plastic bottles, plastic bags) down to bottle cap size pieces and smaller. The non-ferrous material is mostly aluminum with small quantities of solid non-ferrous objects such as brass fittings. Although the moisture content is relatively low, the material appears wet because most of the moisture is contained in the paper component. Due to the paper wetness, the paper adheres to the glass and other solid components.

The current basic method to separating the glass from the non-glass components includes pulverizing the material as it is received from the MRF. This reduces the glass size from two inch minus to ⅜ inch minus without reducing the size of most of the non-glass components. A simple screen then achieves a reasonably good separation. There are, however, small bits and pieces of foreign materials as well as the liquid organic component from the glass bottle contents left behind with the glass. The fundamental problem with this method results from the size reduction. Not only does it generate a significant amount of fines (e.g., glass powder less than 40 mesh), it spreads the liquid organic fraction over a significantly larger surface area. Both of these issues cause subsequent cleaning challenges.

The cleaning has been accomplished by one of two methods: washing and baking. Washing the glass is a proven effective method, but all of the fines end up in the waste water sludge which not only loses potential glass product, the sludge is difficult to dewater and handle. The other method is baking the contaminants off in a fluidized bed dryer at 400° F. The action of fluidization causes particle-on-particle collisions, which knocks most of the baked organic material off of the glass. There must be sufficient residence time and air flow to achieve sufficient cleanliness. The problem is that the airflow required to remove the contaminants to a dust collector from the fluidized glass also removes the glass fines.

The only known installation using fluidized heat to clean dirty MRF glass so far has been unable to produce sufficiently clean glass on a consistent basis. A sample of purportedly clean glass residue was obtained from the installation and subjected to testing under a loss on ignition (LOI) test. Such a test, measures how much of a product is lost, by weight, upon burning. Where there is a high organic component, the loss will be relatively high. When several samples were tested, the overall loss was measured at 1.44%. While this may not seem high, such a result indicates that the purportedly clean glass still contained unsuitably high organics for various end-uses, including use as a pozzolan.

SUMMARY OF THE INVENTION

A method is provided to clean glass mixed with non-glass undifferentiated trash. In accord with one aspect of the method, the glass pieces are kept as large as possible to thereby minimize the amount of surface area that needs to be cleaned. In accord with another aspect of the method, the glass pieces are cleaned without washing the glass pieces with water or a surfactant during the cleaning process. The method requires liberating the non-glass contaminants from the glass by drying and abrasion, and then removing the liberated contaminants by screening and density separation.

In accord with one method, the following steps to clean dirty MRF glass are performed, which may be altered depending on various optional aspects of the method. The steps include:

1. Screen out large foreign materials
2. Dry and disassociate components.

Then, preferably, in order:

3. Remove ferrous metals.
4. Screen the glass pieces into particle size categories.
5. Separate light materials from heavy materials in the size-categorized glass.
6. Optionally, isolate colored glass.
7. Remove non-ferrous metals from the glass pieces.
8. Comminution of the cleaned glass to appropriate size.

The resulting clean glass can be further processed into a number of products that range in size from sub-micron to 1½ inch glass aggregate. These products include, but are not limited to, fine grind products such as pozzolans for use as a cement replacement in concrete and industrial fillers for use in coatings and resins, sand-sized products such as abrasive blasting media, water filtration media, specialty sands paver joint sand, sealcoating sand and non-crystalline silica play sand, and finally aggregate sized products for use in landscaping, decorative concrete, fire pits, etc.

Furthermore, the product may be sanitized to remove active biologics so that the products can be used in medical applications, clean-room applications, or other applications requiring a sanitized product. Such sanitization can occur during the initial drying step, or during or after another disclosed step.

Additional aspects of the method will become apparent with reference to the detailed description below.

DETAILED DESCRIPTION OF THE PREFERRED EMBODIMENTS

A method is provided to clean glass mixed with non-glass undifferentiated trash. In accord with one preferred aspect of the method, the glass pieces as kept as large as possible to thereby minimize the amount of surface area that needs to be cleaned. In accord with another preferred aspect of the method, the glass pieces are cleaned without washing the glass pieces with water or a surfactant during the cleaning process.

Figure 1:
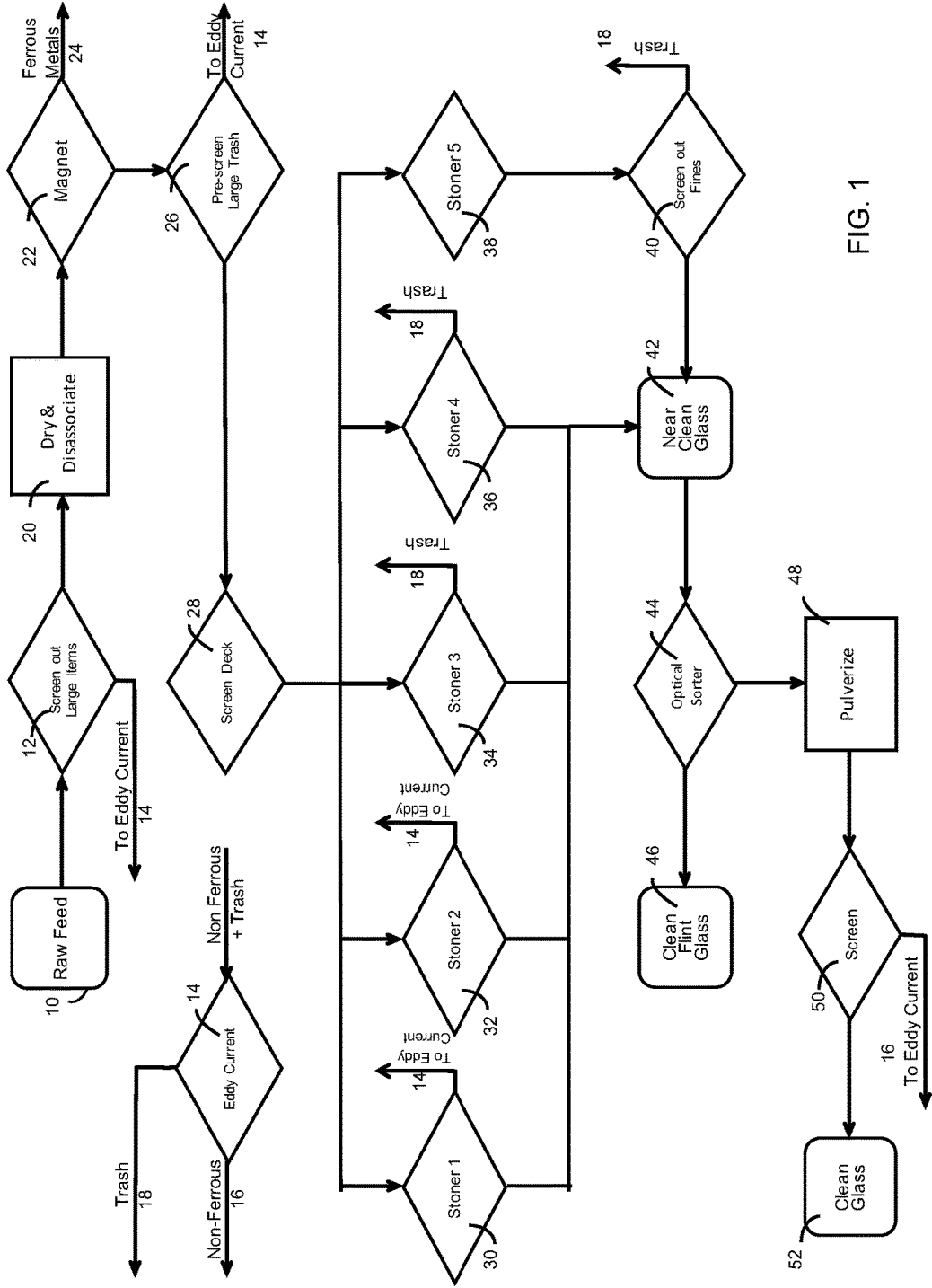
FIG. 1 is a process flow diagram for a glass cleaning portion of the process.

Turning now to FIG. 1, the method to clean the glass mixed with non-glass undifferentiated trash (residue) includes the following steps. The residue is received at 10 from storage, shipment, or conveyance. As indicated above, the residue contains moisture content, generally of 1%-10%, mostly held in a wet paper constituent of the residue.

A first step may include screening out larger foreign materials from the glass constituent. The raw material contains larger plastic pieces (e.g., 4 inch diameter plastic lids, plastic bags, etc.) that must be removed for prior to a subsequent glass separation processes, discussed below. Testing has revealed that failing to do this step significantly reduces separation efficacy. This can be achieved by a stationary grizzly, vibratory screen or a cylindrical trommel type screen. The most problematic materials are plastic bags which can trap a significant amount of glass which gets lost when the bags are removed. The preferred method is a rotary screen or trommel screen 12 because the tumbling action of the screen empties the plastic bags. The size of screen aperture will depend on raw material glass size, but typically is between 2-3 inches. The larger trash from the screen 12 is sent to an eddy current system 14 that further separates non-ferrous metal from trash, for respective storage of each: non-ferrous metal storage at 16 and trash storage at 18.

Next, the screened glass is dried, polished and disassociated at 20. The drying reduces moisture content to an acceptable level. The disassociation of components liberates the glass. The polishing removes dried organic liquids and semi-liquids and labels off of the glass. Alternatively, due to the stickiness of the wet paper, a first stage of the process can include sufficiently drying, polishing, and agitating the raw residue to disassociate all of the disparate materials and liberate the glass, prior to the screening. However, the method, for purposes of the description herein, will assume screening prior to this drying step.

While several different drying technologies can be used, preferred drying uses a rotary dryer. A rotary dryer is made up of a large, rotating cylindrical tube, usually supported by concrete columns or steel beams. The dryer is configured to slope slightly so that the discharge end is lower than the material feed end in order to convey the material through the dryer under gravity. The residue material to be dried enters the dryer, and as the dryer rotates, the material is lifted up by a series of internal fins ("lifters") lining the inner wall of the dryer. When the material gets high enough to roll back off the fins, it falls back down to the bottom of the dryer, passing through the hot gas stream as it falls. This gas stream can either be moving toward the discharge end from the feed end (known as co-current flow), or toward the feed end from the discharge end (known as counter-current flow). The gas stream can comprise a mixture of air and combustion gases from a burner, in which case the dryer is called a direct heated dryer. Alternatively, the gas stream may comprise air or another (sometimes inert) gas that is preheated. When the gas stream is preheated by some means where burner combustion gases do not enter the dryer, the dryer known as an indirect-heated type. Often, indirect heated dryers are used when product contamination is a concern. It is also possible to use a combination of direct-indirect heated rotary dryers to improve the overall efficiency.

The action of lifting and dropping the material in the drum thoroughly disassociates the components and liberates the glass. This action also reduces the size of the glass to which extent depends on the residence time. For example, a test in a rotary dryer with a residence time of 30 minutes reduced the glass size from 2 inch minus to less than 1¼ inch. Shorter residence time will result in less size reduction. The lifting and dropping action also eliminates all (or substantially all) of the sharp edges and polishes most of the organic material off of the glass. The only remaining organic material on the glass are residual labels on approximately 1%-10% of the larger glass pieces. Shorter residence times will result in more residual labels on the glass. Longer residence times will result in further reduction of moisture content, enhanced liberation and disassociation of the glass from bottle labels, enhanced removal of organic contaminants, and additional polishing of the edges of the glass.

Any type of rotary dryer can be used including but not limited to direct fired, indirect fired, combined direct and indirect, co-current flow, counter-current flow, natural gas or electric.

Further, as one alternative to a rotary dryer, a heated fluidized bed dryer may be used. A fluidized bed is formed when a quantity of a solid particulate substance (usually present in a holding vessel) is placed under appropriate conditions to cause a solid/fluid mixture to behave as a fluid. This is usually achieved by the introduction of pressurized fluid (normally air) through the particulate medium. This results in the medium then having many properties and characteristics of normal fluids, such as the ability to free-flow under gravity, or to be pumped using fluid type technologies. When heated air is used to fluidize the material bed, it imparts a drying effect to remove moisture from the residue. Since there are particle-on-particle collisions in the fluidization process, the disparate materials are dissociated, hence liberating the glass. However, using this method to dry and liberate the glass will result in very little size reduction of the glass and is less efficient in polishing labels and other organics off of the glass than a rotary dryer.

The application of either rotary dryer or fluidized bed technologies can sanitize the material. Sanitization means killing all of the bacteria. Since the residence time in the fluidized bed dryer is relatively short, it must be operated at a temperature around 400° F. for sanitization. Sanitization in a rotary dryer would require the glass to be heated to 250°-300° F. The flame temperature required to heat glass to these temperatures will depend on residence time; i.e., shorter residence times require higher temperatures. Another option for sanitization is to operate the rotary dryer at the minimum temperature to achieve separation and glass liberation and employ a fluidized bed dryer at the end of the process at the appropriate temperature.

A currently preferred method of drying, sanitizing and disassociation is with a natural gas direct-fired co-current flow rotary dryer with lifters.

The order of the screen (and screening) 12 and the dryer (and drying) 20 may be optionally interchanged, such that the dirty MRF glass is sent through the screen 12 after being dried in the dryer 20.

After the glass has been screened and screened at 12, and dried (and optionally sanitized) at 20, ferrous metals are then removed at 24. An inline or rotating belt magnet 22 is used to remove the ferrous metals and send such ferrous metal material to a ferrous metal storage 24. After removal of ferrous metals using the magnet separator, the glass is screened in two stages.

In a first stage of screening at 26, foreign materials larger than the largest piece of glass are removed as the glass is received from the dryer and ferrous metal removal steps. Non-ferrous foreign material is removed from the foreign material via eddy current 14. The screen size is set depending on the size of the glass raw feed and residence time in the dryer. In one system, the screen size is between 1¼ and 1½ inches. A horizontal vibrating table screen may be used to screen the foreign materials of such size.

Then, in a second stage of screening, a screen deck 28 is used to separate the glass pieces into multiple size categories for respective density separation 30, 32, 34, 36, 38 within each size category, as described in detail below. Preferably a deck of five size categories is used, which has been shown to work particularly well. Density separation separates lighter density materials from heavier density materials. This technology has been found to be most effective when the particles are of relatively similar size. Therefore, the more size classes created for separation of the particles, the more effective the separation has been found to be. A field test with two size categories did not result in particularly satisfactory separation and both size fractions required further processing. A test with four particle size categories was shown to effectively separate glass from the lighter density foreign materials but in the smallest size, the smaller glass particles fluidized and went with the lighter fraction. This was solved by adding an optional fifth particle size category by splitting the smallest size into two categories. In a preferred embodiment, a single four-deck screen 28 is used to create all five size categories simultaneously. However, fewer or more screens can be used to create fewer or more size categories as dictated by the range in glass particle sizes.

The selection of the upper and lower size of each particle size category has a significant effect on separation efficacy. A significant variable is the percentage size difference between the largest and smallest particle. Referring to Table 1, below, a preferred size range in each of five particle size categories of the screens is provided, along with the percent difference in size between the largest and smallest particle in each screen size category. During a test that resulted in excellent separation for the 1¼ inch to ¾ inch size category, the particles had a potential range of ½ inch; i.e., no more than 40 percent difference between the largest and smallest particle. In another test, a size category was set up for particles between ⅜ inch to 12 mesh. Even though this size differential was less than ⅓ of an inch, the separation was unacceptable; it was noted that the potential size different between the largest and smallest particle in the size category was an 82% size difference. Based on this knowledge, the optimal size categories are shown in Table 1, with the percent difference between the largest and smallest particle.

TABLE 1

Particle Size Ranges for Screen Deck
Five Size Categories

| Size range | % Difference in Size |
|---|---|
| 1 ¼−, ¾+ | 40% |
| ¾−, 7/16+ | 42% |
| 7/16−, ¼+ | 43% |
| ¼−, ⅛+ | 50% |
| ⅛−, 14 mesh− | 56% |

In a preferred embodiment, the four deck screener 26 is preferably configured to separate glass into the five particle size categories shown in Table 1. Dirty MRF glass can come from many different sources and each source produces a glass residue unique to each MRF process and habits of the human population that the MRF serves. Therefore, variability in glass size and non-glass composition is expected and must be dealt with effectively. By sorting the material stream into five size categories, this variability becomes a non-factor.

After the material is sorted by size, the trash is separated from the glass using density separation, as the glass and most of the trash have different densities. (Non-ferrous trash of similar densities is dealt with later in the process.) Each size fraction is processed in a separation technology that employs vibration and air to separate materials by density. This technology is commonly known as a "Stoner" or "DeStoner".

Standard Stoner technologies can each be used in the method. The density separation technology manufactured by General Kinematics (GK), called a DeStoner by GK, employs a vibrating trough that uses air to fluidize the bed material causing light material to rise above the heavier material. A jet of air (or "air knife") at the right velocity and elevation blows the light material over a dividing plate and the heavy fraction drops to a conveyor below. This technology comes in "single knife" and "dual knife" versions. Dual knife Stoners have a built in screen to divide the material into two size fractions and separation is accomplished with two air knives on separate troughs with separate blowers.

Density separation can be described using an exemplar ideal situation in which two different materials have the exact same size and shape. If these materials have a density different greater than 20%, the technology will yield perfect separation. In the real world, particles do not have the exact same size and shape. However, sorting the material into the five (or so) size categories comes as close as practical to mimicking the ideal situation. The Stoner separation of the trash for the ⅛ minus size category is effective down to approximately 10 to 12 mesh; i.e., only particles greater in size than 10 to 12 mesh are recovered and smaller glass particles are fluidized and slide downhill with contaminants. It has been found that the contaminants in 12 mesh minus material are the fine dust polished off the glass and other solid foreign objects and the fine dust from soil that is reduced to a very small size in the rotary dryer. A 40 mesh vibratory screen can be used at 37 to effectively separately these contaminants from the 12 to 40 mesh glass.

In a test, material that was dried in the rotary dryer was screened into two sizes of approximately equal weight: (1) 1¼ inch minus to ⅜ inch plus, and (2) ⅜ inch minus. A test run of the ⅜ inch plus size fraction on a single knife Stoner removed the vast majority of non-glass material; however, heavy plastic pieces, stones, ceramics, and plastic bottle caps were easily visible in the glass. For example, if a plastic screw-on bottle cap becomes filled with smaller glass particles it will act like a heavy particle instead of a light particle. These foreign materials will need to be removed in a subsequent step. A test run on the ⅜ inch minus fraction used different air pressure settings for the fluidization and air knife and resulted better separation, but the glass is still not clean enough.

The other "Stoner" technology employs a fluidized horizontally vibrating bed that is set on a slight angle. Given the correct vibration intensity, bed angle and air flow, heavier material is not fluidized and travels uphill and off the bed. The light material is fluidized and slides downhill and off the bed due to gravity. The reason the heavy particles flow uphill is due to horizontal vibration and lack of fluidization; i.e., the heavy particles are in constant contact with the bed and are pushed upward by the horizontal vibration. There are several manufacturers of these types of Stoners offering variations on the same principal and including, but are not limited to, Triple S Dynamics (SSS), Oliver and Carrier.

A test was run by screening the material into four different size categories: 1¼ inch-¾ inch; ¾ inch-½ inch; ½ inch-⅜ inch; and ⅜ inch-14 mesh. As previously discussed, the three largest categories produced outstanding separation but the ⅜ inch-14 mesh could not get the smaller glass particles to move uphill (or upgrade) with the larger glass particles. This is determined to be because the percent difference between the smallest and largest particles is too large. Splitting this size category into two sizes produced excellent results. The conclusion from these tests is that separating the glass into five size categories, using five Stoners 30, 32, 34, 36, 38, each for a separate particle size range category, is particularly advantageous for the efficient separation of glass from foreign particles.

A test run of the 1¼ inch to ⅜ inch particle size material containing foreign particles that was produced by the GK DeStoner on the SSS Stoner resulted in excellent separation. Both technology types will work, but the preferred technology is the SSS for several reasons. First the technology is simple and easy to master because the separation can be visualized as it occurs. Once the air speed, bed angle and vibration frequency are set, it requires very little attention because the variation in the feedstock size is removed by screening it into five size categories. Also, a single person can operate all five Stoners. Second, having five Stoner units provides flexibility to handle different glass feedstocks. Viewing the separation real time in the GK technology is not as easy and since only two size categories are processed, it will require constant attention to adjust air flows as feedstock size and composition varies.

Stoner manufacturers have previously tried to separate dirty MRF glass. However, in such prior instances, the Stoner (or DeStoner) did not adequately separate the materials and was rejected as a suitable technology for glass recovery. The reason those tests failed is that the glass was not previously dried to liberate the glass in accord with the method taught herein.

After density separation at 38, the smallest range of particles is further screened at 40 to remove fines, which are sent to trash storage 18. The resulting glass from stoners 30, 32, 34, 36, 38 and fine screen 40 is provided at a near clean state 42.

Then, the glass is optionally optically sorted at 44 to segregate the clean flint cullet 46 from the colored recycled glass. Flint cullet is optical glass that has a relatively high index and low Abbe number (high dispersion). Flint glasses are arbitrarily defined having an Abbe number of 50 to 55 or less, and refractive indices ranging between 1.45 and 2.00. Potential end-use products for the cleaned flint cullet include an extremely bright and white glass powder that can be used as a pozzolan in architectural concrete products or as industrial filler. If a significant percentage of the clean glass is colored glass, the glass cannot be used for such end-use products. Since the raw feedstock is mixed color, optical sorting technology is employed to isolate the flint cullet from the colored glass, so that the flint cullet can be used as a feedstock for the white pozzolan and industrial filler. The two largest size categories of glass from the Stoner, 7/16 inch to 1¾ inch, are processed by the optical sorter, and separated into a clean flint glass storage bin 46.

The objective of the optical sorting is to minimize the percentage of non-flint glass within the clean flint glass storage 46 to less than 2 percent. This can be accomplished with one optical sorter that is calibrated to minimize non-flint colors, but allows some minimal degree of flint glass to pass with the non-flint fraction. Although this does not maximize the capture of flint glass, it does provide sufficient flint glass for the targeted products at a very high purity level. Optionally, additional separation and capture of a higher percentage of flint glass can be carried out with additional optical sorter(s) in series. It is appreciated that if a white pozzolan, a white industrial filler, or other glass product requiring a higher percentage of flint glass are not intended end-use products, then the step of sorting flint cullet from the colored glass cullet can be eliminated from the process.

The near clean non-flint glass exiting the optical sorter 44 may still have hard stones and heavy non-ferrous objects therewithin. This is because such objects have similar densities to glass, and will therefore remain with the glass portion through density separation within the Stoners 30, 32, 34, 36 and 38. After the optional optical sorting at 44, such like density impurities are removed from the glass. This is accomplished by pulverizing the glass at 48, preferably using a vertical shaft impactor (VSI) mill equipped with a tubular rotor. A VSI mill comminutes particles of material into smaller (finer) particles by impacting the particles against a hard surface inside the mill (called the wear plate). The tubular rotor increases the impact velocity of the glass on the wear plate. A screen 50 with an aperture size larger than the largest comminuted glass particles will screen out any remaining foreign objects that are not reduced in size by the VSI. The foreign objects are sent by eddy current 16 to remove non-ferrous objects and then to the trash storage 20.

All of the remaining clean glass 52 at this stage (excepting the prior separated flint glass) is collected into clean glass storage containers, bunkers, or locations.

Figure 2:
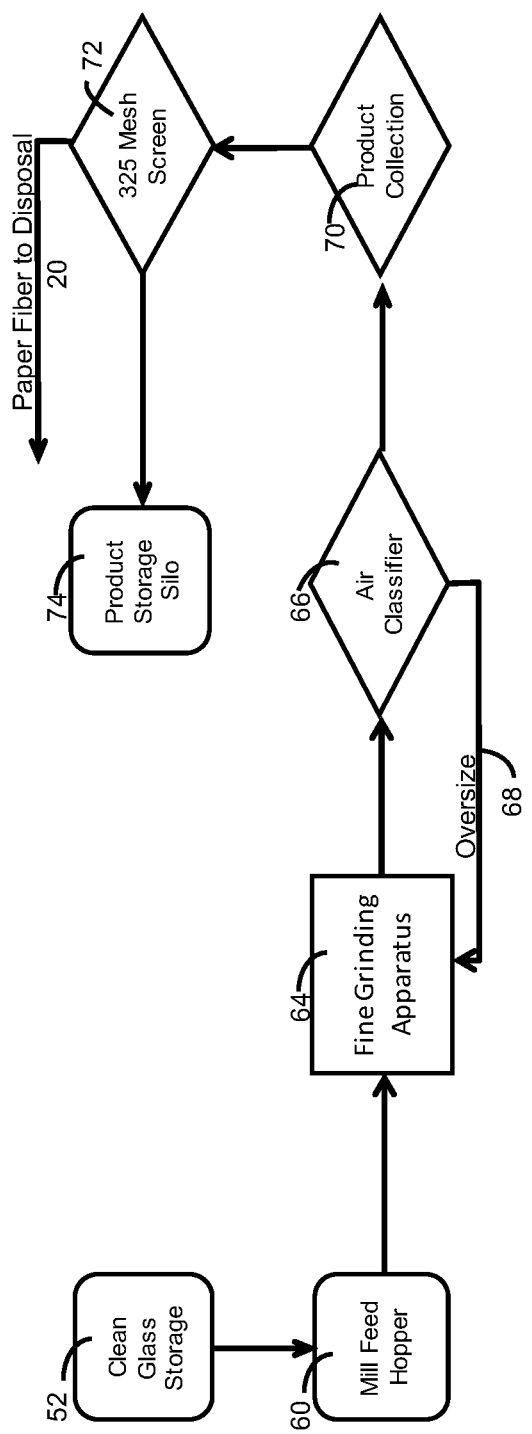
FIG. 2 is a process flow diagram for a grinding portion of the process.

Once the clean glass is collected at storage containers 52, it is ready to be further processed, at either an immediately following step or a later time as needed, as shown in FIG. 2. For many end-use purposes, the glass, once clean, often requires fine grinding, although such additional grinding is not a necessary part of the process for cleaning the MRF glass. The glass designated for glass particles, glass powders and glass fillers that do not have a whiteness or brightness requirement is preferably processed separately from the flint glass, as described below.

Clean glass 52 is transferred from its storage to a mill feed hopper 60 which supplies the clean glass to a fine grinding apparatus 64. Fine grinding can occur in any type of fine grinding apparatus 64 sufficiently robust to grind glass including, but not limited to, all types of ball mills and tube mills, vertical roller mills, attritor mills (stirred media mills and dense packed stirred media mills), vibratory mills, jet mills (or Air Classification Mills), ISA mills, Roller mills, High Pressure Grinding Rolls (HPGR) and Aerosion Ltd's "disintegrator" technology. The ball mill is proven technology for grinding bottle glass and is reasonably efficient when grinding feed stock of this size. These ultra-fine particles create a very large specific surface area which is positively related to pozzolanic reactivity.

Fine grinding 64 occurs in a closed-loop circuit utilizing a dynamic air classifier 66 that can produce a relatively narrow particle size distribution consistently. The air classifier 66 is employed to separate particles from the fine grinding apparatus 64 when they become the target size. The air classifier is an industrial machine which separates materials by a combination of size, shape, and density. It works by injecting the material stream to be sorted into a chamber that contains a column of rising air. Inside the separation chamber, air drag on the objects supplies an upward force which counteracts the force of gravity and lifts the material to be sorted up into the air. Due to the dependence of air drag on object size and shape, the objects in the moving air column are sorted vertically and can be separated in this manner.

The many air classifier technologies are generally classified as either static or dynamic. One dynamic air classifier technology employs a rotor with many blades that at the right rotational velocity allows lightweight particles to pass through without contacting the rotor blades and slower moving heavy particles make contact with the blades and are knocked to the outer side of the classifier and are conveyed back to the grinding device for additional size reduction. The particles removed from the air classifier are separated from the air stream by a cyclone or bag house. The rotor rotational speed determines the material cut point size. This is the preferred air classification technology.

The particle size targeted by these grinding circuits ranges from a median particle size of 12 micron down to 4 micron and smaller depending on the type and size of grinding device. The fine grinding apparatus 64 may have a different throughput rate depending on device type and size.

Another optional step is to include further grinding and/or classification devices to produce even smaller particle sizes. One method is to perform secondary air classification on the 10 or 12 micron median size particle material that splits it into two sizes, each with their own particle size distribution. The larger material can either be marketed as a different product if such a market exists. Otherwise, it must go back into the grinding device for further size reduction. This works well for most grinding devices except vertical roller mills because the addition of fine material into the mill has a cushioning effect that reduces throughput rates.

If finer grinds down to submicron size are contemplated, there are at least two options that can handle grinding to sizes ranging from 5-6 micron median particle size to submicron sizes: a jet mill and dense packed stirred media mill.

The grinding friction in some dense packed stirred media mills generate significant heat and the units must be equipped with a metal jacket to circulate water for cooling. The preferred option is a dense packed stirred media mill because it requires a fraction of the energy that a jet mill requires to achieve these ultra-fine grinds.

In order to increase process throughput in the fine grinding stage, multiple hopper/feeders 60 and fine grinding apparatus 64 may be used to convey the glass and grind the glass to a suitable size, with oversize glass particles being returned at 68 by one or respective air classifiers 66 for further fine grinding in the respective mills 64.

Pozzolanic glass particles that are intended for use in concrete products that use gray Portland cement do not have whiteness or brightness requirements, whereas flint glass particles can be used to manufacture products requiring extremely white and bright powder, such as industrial filler and white cement concrete products. The final processing of these glass products may utilize separate hoppers/feeders, grinding apparatus, and air classifiers to prevent color contamination of the white products.

Once the glass particles are ground to the desired particles size range, with a defined particle distribution, they are collected at 70. From collection 70, the glass preferably passes through a final screening 72. It is recognized that not all of the paper labels are removed by the abrasion in the rotary dryer or the Stoner separation technology. When the glass is ground in the fine grinding apparatus, the paper is fully liberated into individual fibers which tend to attract each other and ball up into small dust balls. The overall quantity is small (much less than 1%) but depending on the actual quantity and end use of the glass powder, it may or may not be a problem. Architectural concrete products do not tolerate impurities well whereas it is not a problem for most gray concrete products. Further, the presence of paper fiber eliminates the glass for use in most industrial filler applications. The paper fiber can be screened out by a 45-325 micron screen at 72, and sent to trash 20, yielding an extremely clean powdered glass product. The screening can be done for any size material that is 12 micron median particle size or less. The yielded glass powder 74 is very clean and suitable for all industrial fillers and architectural concrete applications. The glass powder 74 is sent to storage, bagging, truck load out, or location for later or immediate use.

The final glass powder has been tested for overall loss on ignition (LOI). Sample test results show a LOI of down to 0.05%±0.2, substantially better than the LOI of 1.44% from prior art that used a different method which also does not liquid wash the dirty glass to clean the glass. This indicates that the clean glass from the described method was substantially free of organics, and at a level that is inconsequential to the performance of a pozzolan. The LOI of glass cleaned in accord with the described method is repeatable, and will consistently have a LOI not exceeding 1%, and preferably less than 0.75%, more preferably less than 0.5%, and even more preferably less than 0.25%.

From the above, it is recognized that the clean glass can be processed into a number of products that range in size from sub-micron to 1½ inch glass aggregate. These include, but are not limited to, fine grind products such as pozzolans for use as a cement replacement in concrete and industrial fillers for use in coatings and resins, sand sized products such as abrasive blasting media, water filtration media, specialty sands paver joint sand, sealcoating sand and non-crystalline silica play sand, and finally aggregate sized products for use in landscaping, decorative concrete, fire pits, etc.

Also, where the system and process are described with multiple references to eddy currents and trash storage, it is recognized that that a single or multiple eddy current can be used, and similarly a single or multiple trash storage can be used, or preferably strategically positioned within or throughout the overall system.

There have been described and illustrated herein embodiments of processes to clean and fine grind glass. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its scope as claimed.

What is claimed is:

1. A method of cleaning dirty glass from a material recovery facility, consisting of:
   a) first screening to remove foreign materials from the glass;
   b) drying and polishing the glass;
   c) using a magnet to separate ferrous metals from the glass;
   d) second screening the glass into multiple particle size categories;
   e) in each of the multiple particle size categories, performing density separation to separate from the glass trash having a different density than the glass;
   f) pulverizing the glass;
   g) third screening to separate the pulverized glass from trash having a similar density to glass to result in clean glass, all without washing the dirty glass with a liquid.

2. The method according to claim 1, wherein:
the screening out foreign materials occurs before the drying the glass.

3. The method according to claim 1, wherein:
the drying the glass occurs before the screening out foreign materials.

4. The method according to claim 1, wherein:
the second screening screens the glass into at least three size categories.

5. The method according to claim 1, wherein:
the second screening screens the glass into five size categories.

6. The method according to claim 1, wherein:
the clean glass has a loss on ignition (LOI) not exceeding 1%.

7. The method according to claim 1, wherein:
the clean glass has a loss on ignition (LOI) not exceeding 0.5%.

8. The method according to claim 1, wherein:
the clean glass has a loss on ignition (LOI) less than 0.25%.

9. The method according to claim 1, wherein:
a) and b) are performed before c) to g).

\* \* \* \* \*